United States Patent
Herman et al.

(10) Patent No.: US 7,089,777 B2
(45) Date of Patent: Aug. 15, 2006

(54) HIGH SPEED PNEUMATIC ACCELERATOR

(75) Inventors: Brian Herman, Royal Oak, MI (US); Larry Schaefer, Bloomfield Township, MI (US); Charles Freeburn, Hartland, MI (US); David Gorman, Royal Oak, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 72 days.

(21) Appl. No.: 10/920,837

(22) Filed: Aug. 18, 2004

(65) Prior Publication Data

US 2006/0037381 A1    Feb. 23, 2006

(51) Int. Cl.
  *G01N 3/08* (2006.01)
  *G01N 3/30* (2006.01)

(52) U.S. Cl. .................................... 73/12.07

(58) Field of Classification Search ............... 73/37, 73/12.07
   See application file for complete search history.

(56) References Cited

U.S. PATENT DOCUMENTS

| 770,128 A | 9/1904 | Teal | 267/64.11 |
|---|---|---|---|
| 3,823,600 A * | 7/1974 | Wolff | 73/12.07 |
| 4,008,784 A * | 2/1977 | Bays | 181/114 |
| 5,517,898 A | 5/1996 | Kim et al. | 91/24 |
| 5,686,652 A * | 11/1997 | Pfund | 73/12.04 |
| 6,170,768 B1 | 1/2001 | Harmon et al. | 241/5 |
| 6,619,634 B1 | 9/2003 | Chen et al. | 267/64.17 |

* cited by examiner

*Primary Examiner*—Hezron Williams
*Assistant Examiner*—Rodney Frank
(74) *Attorney, Agent, or Firm*—Ralph E. Smith

(57) ABSTRACT

A pneumatic testing apparatus is provided for accelerating a mass. The apparatus has a housing defining a reservoir and a cylinder having an opened proximate end and a closed distal end. The opened proximate end is positioned within the reservoir and a piston is positioned in the cylinder. The piston has a first side and a second side. A shaft connects to the first side of the piston, the shaft being positioned coaxially within the cylinder and extending through its closed distal end. An exhaust orifice is located at the closed distal end, wherein the mass is positioned on the portion of the shaft extending from the distal end of said cylinder and is accelerated as a gas at a first pressure located in the reservoir enters the open proximate end of the cylinder and urges against the second side of said piston, thereby causing the piston to accelerate toward the distal end of the cylinder and simultaneously accelerate the mass.

7 Claims, 2 Drawing Sheets

HIGH SPEED PNEUMATIC ACCELERATOR

FIELD OF THE INVENTION

The present invention relates to devices for testing vehicle bodies, and more particularly to such devices that linearly accelerate a mass towards the vehicle body.

BACKGROUND OF THE INVENTION

Certain political regions are phasing in requirements that vehicle exteriors be designed such that they minimize injury to a pedestrian's skull in the event of a collision between the vehicle and the pedestrian. Faced with this requirement, vehicle manufacturers are developing test tools for verifying compliance with the new rules.

One such family of test tools is devices for accelerating a placebo of the human skull, known in the art as a head form, towards a vehicle body portion. Devices known to the inventor include hydraulic actuators and mechanical spring arrangements that accelerate the head form; however, the inventors found these devices to be undesirably expensive in the marketplace. As such, the inventors have arrived at a pneumatic arrangement that provides a sufficient rate of acceleration and is economical to construct.

SUMMARY OF THE INVENTION

In furtherance of the needs stated above, a pneumatic testing apparatus is provided for accelerating a mass. The apparatus has a housing defining a reservoir and a cylinder having an opened proximate end and a closed distal end. The opened proximate end is positioned within the reservoir and a piston is positioned in the cylinder. The piston has a first side and a second side. A shaft connects to the first side of the piston, the shaft being positioned coaxially within the cylinder and extending through its closed distal end. An exhaust orifice is located at the closed distal end, wherein the mass is positioned on the portion of the shaft extending from the distal end of said cylinder and is accelerated as a gas at a first pressure located in the reservoir enters the open proximate end of the cylinder and urges against the second side of said piston, thereby causing the piston to accelerate toward the distal end of the cylinder and simultaneously accelerate the mass.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
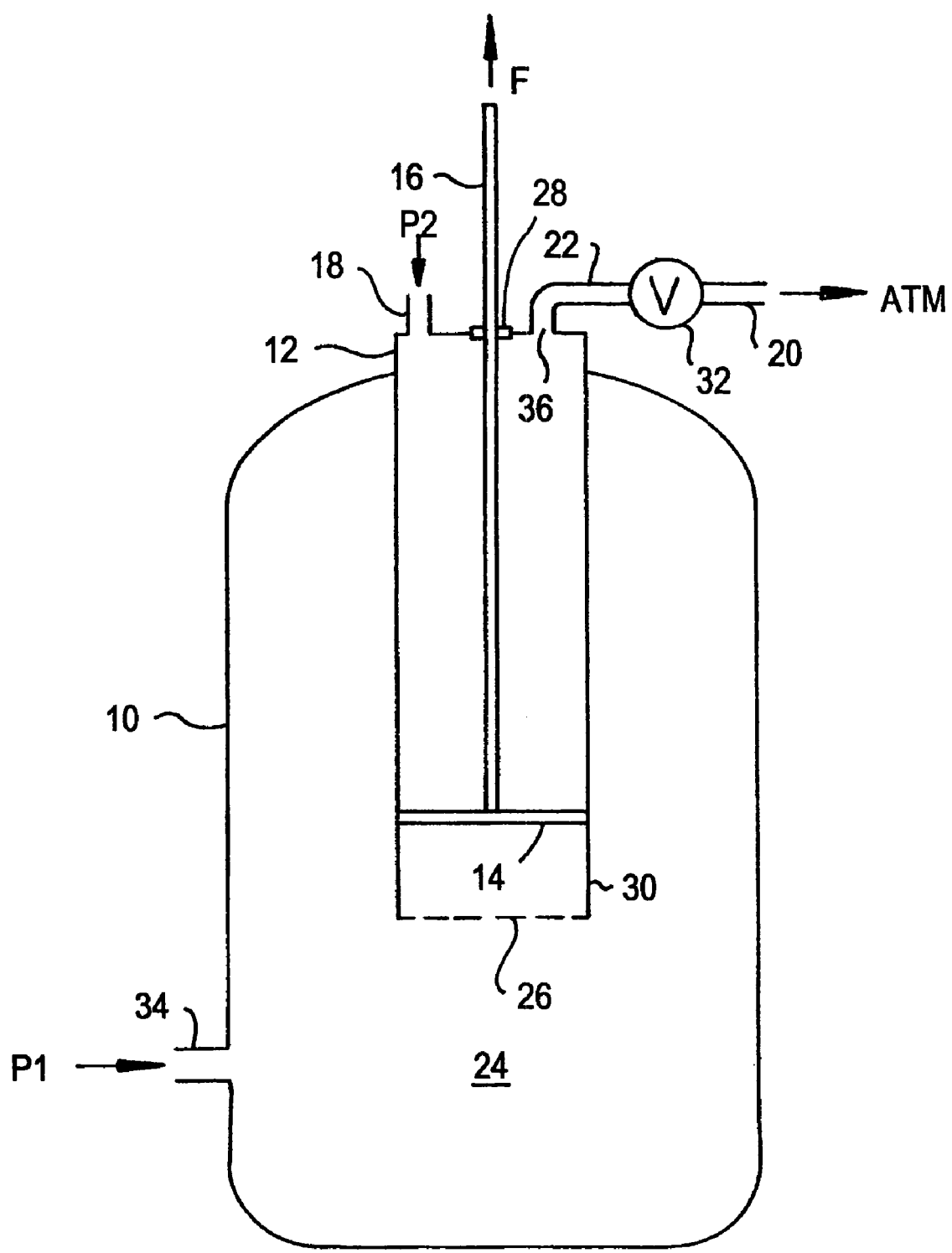
FIG. 1 depicts a pneumatic diagram of the apparatus.

Turning to FIG. 1, a pneumatic diagram of the apparatus is shown. A housing 10 has a cylinder 12 disposed at least partially therein. The cylinder 12 contains a piston 14 connected to a shaft 16, which extends coaxial to the cylinder 12 and protrudes therefrom at a distal end. A seal assembly 28 prevents gas contained within the cylinder from escaping by the shaft 16.

A proximate end 30 of the cylinder 12 has one or more orifices 26. The orifices 26 may be located in the cylinder end cap, the cylinder wall, or both, and allow gas to flow between the interior of the proximate end 30 of the cylinder 12 and the reservoir 24 space located interior of the housing 10. An inlet 34 is provided to allow the reservoir to be charged with gas at a first pressure P1. The gas at first pressure P1 acts upon the piston 14.

At the distal end of cylinder 12, an exhaust port 36 provides gaseous communication with a valve 32 via outlet piping 22. A reset inlet 18 is also provided at the distal end of cylinder 12. A valve 32 has an exhaust port 20 selectively vented to atmospheric pressure ATM. In a first operating mode, valve 32 prevents gaseous communication between the outlet piping 22 and exhaust 20. In a second operating mode, valve 32 provides gaseous communication between the outlet piping 22 and exhaust 20. In one aspect of the invention, valve 32 is an air pilot actuated valve sold by NUMATICS, INC as part number NAF26220A0N14AO. The NUMATIC valve was then further modified using methods known in the art to provide an airflow rate of 1100 CFM in the second mode of operation.

In operation, the apparatus is made ready to use by placing a head form upon the end of shaft 16 which protrudes from the distal end of cylinder 12. The valve 32 is then placed in the first mode of operation. Pressurized gas at a second pressure P2, which is greater than the first pressure P1, is applied to the reset inlet 18 until the piston 14 moves to the proximate end 30 of cylinder 12. When a user desires to discharge the apparatus and thereby accelerate the head form, the valve 32 is placed in the second mode of operation. In the second mode, the pressurized gas on top of the piston is vented to atmosphere ATM via the outlet piping 22 and exhaust port 20. The gas at pressure P1, which is stored in reservoir 24, then flows through the orifices 26 to urge piston 14 upwards in the cylinder 12 towards the distal end. The shaft 16 moves concurrently with the piston 16 with force F, which is a function of the gas pressures on each side of the piston 14 and the surface areas on each side of the piston 14 as is known in the art.

In one aspect of the invention, a first gas pressure P1 of 80 PSI was sufficient to accelerate a 10 lb. hemispherical head form to between 25 and 32 MPH. A second gas pressure P2 of 100 PSI was used to move the piston 14 to the proximate end 30 of cylinder 12. The diameter of the piston 14 was 3.25 inches, and the diameter of shaft 16 was 0.75 inches.

Figure 2:
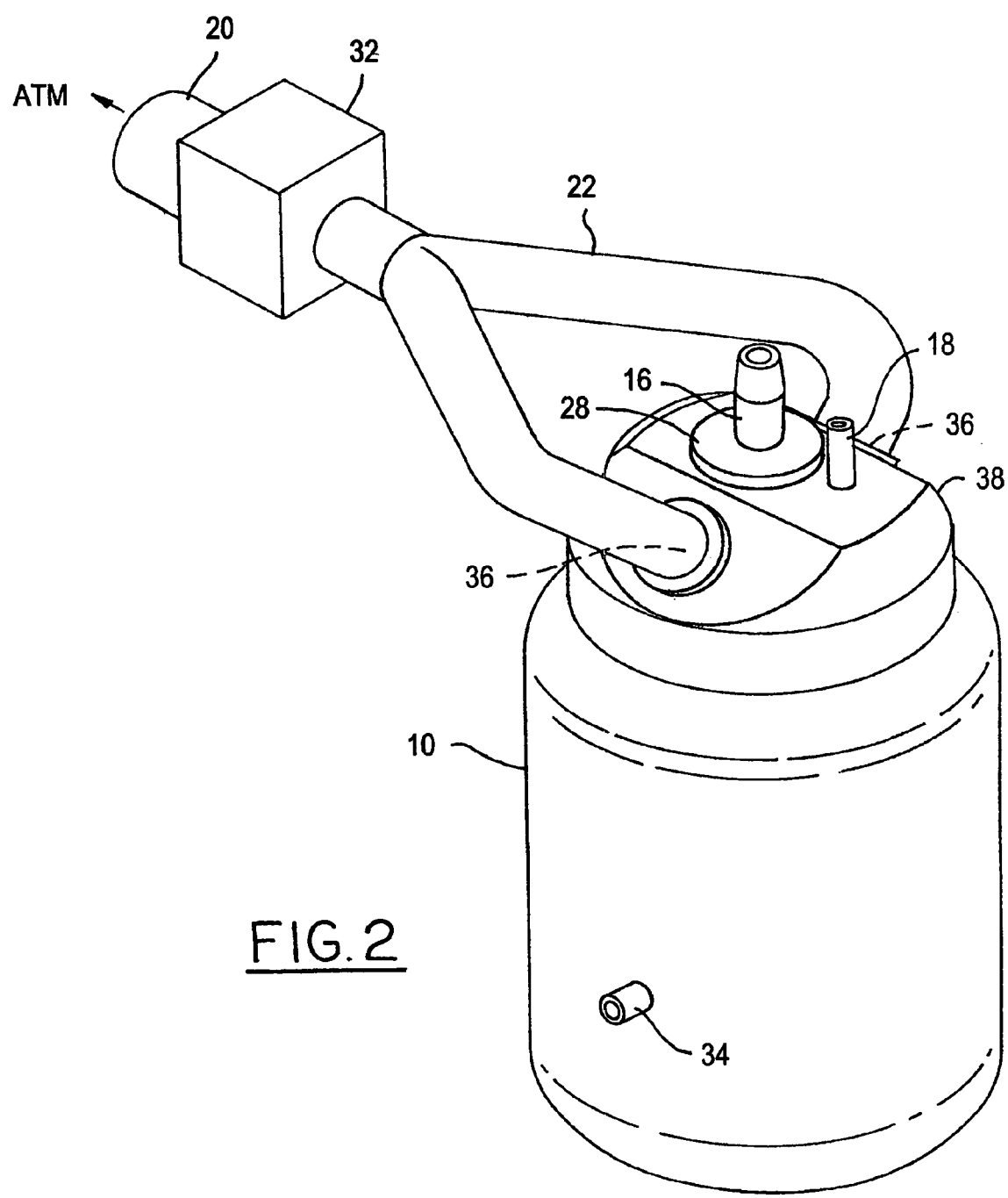
FIG. 2 depicts an exterior view of the apparatus.

Turning now to FIG. 2, an external view of an embodiment is shown. The distal end of shaft 16 protrudes from seal assembly 28. Outlet piping 22 is formed as a Y-pipe assembly connected between valve 32 and a manifold 38. In one aspect of the invention, the outlet piping 22 is formed of 1.5 inch internal diameter pipe feeding into a collector portion having an internal diameter of 2 inches. The manifold 38 provides conduits for gas flow between the outlet piping 22 and the exhaust ports 36. It should be noted that while the pneumatic diagram of FIG. 1 depicts a singular exhaust port 36, the depicted embodiment provides two exhaust ports 36 at the distal end of cylinder 12. Three or more exhaust ports 36 may also be used with a matching manifold and cylinder assembly to increase the gas flow rate through an outlet piping arrangement 22.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pneumatic testing apparatus for accelerating a mass, said apparatus comprising:
   a housing defining a reservoir;
   a cylinder having an opened proximate end and a closed distal end, said opened proximate end being positioned within said reservoir;
   a piston positioned in said cylinder, said piston having a first side and a second side;
   a shaft connected to said first side of said piston, said shaft being positioned coaxially within said cylinder and extending through said closed distal end; and
   an exhaust orifice located at said closed distal end, wherein the mass is positioned on the portion of said shaft extending from said distal end of said cylinder and is accelerated as a gas at a first pressure located in said reservoir enters said open proximate end of said cylinder and urges against said second side of said piston, thereby causing said piston to accelerate toward said distal end of said cylinder and simultaneously accelerate the mass.

2. The apparatus of claim 1 further comprising a valve in gaseous communication with said exhaust orifice, said valve operating to control the release of gas at a second pressure urging against said firs side of said piston.

3. The apparatus of claim 2, wherein said valve comprises an air pilot actuated valve.

4. The apparatus of claim 2 wherein said valve flows to atmosphere at least 1100 CFM of said gas at a second pressure.

5. The apparatus of claim 2 further comprising a reset port for allowing said closed end of said cylinder to be charged with said gas at a second pressure.

6. The apparatus of claim 2 wherein said gaseous communication is effected through a Y-pipe.

7. A method for accelerating a head form during the testing of vehicle bodies, the method using a pneumatically operated apparatus having a reservoir defined by a housing, a cylinder with an opened end positioned in the reservoir, a piston having first and second sides and being positioned in the cylinder, a shaft connected to the first side of the piston and extending coaxially with cylinder and away from its opened end, and an exhaust orifice located at the cylinder end from which the shaft emanates, the method comprising:
   pressurizing the reservoir with a gas at a first pressure;
   pressurizing the portion of the cylinder exposed to the first side of the piston with a gas at a second pressure, the second pressure being greater that said first pressure;
   releasing the gas at a second pressure to atmosphere, thereby allowing the gas at a first pressure to accelerate the piston and shaft simultaneously, the head form being accelerated by the shaft.

* * * * *